UNITED STATES PATENT OFFICE.

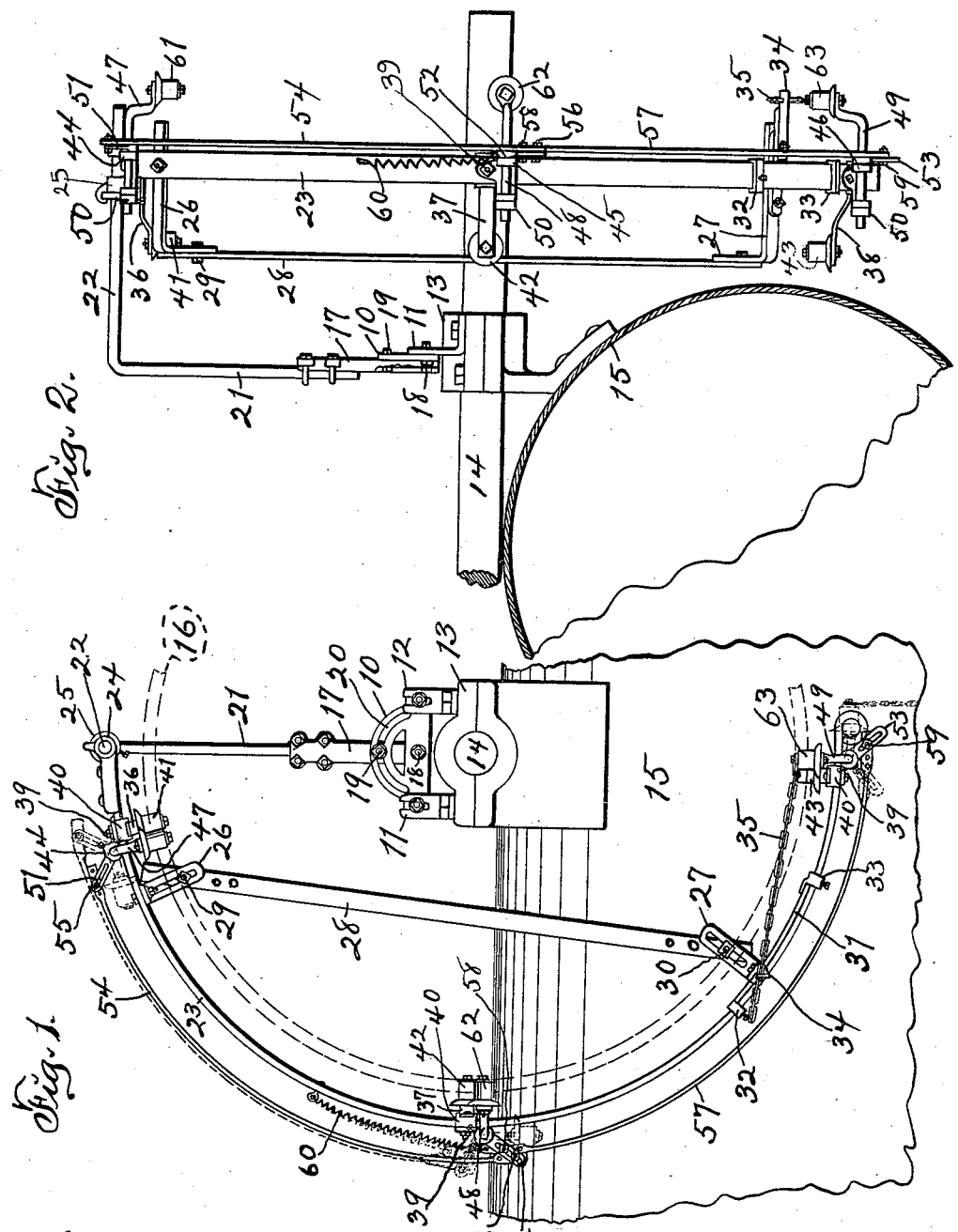

ELMER HICKS AND CLARENCE E. HICKS, OF MONTEZUMA, IOWA.

BELT-HOLDER FOR ENGINES.

1,013,388.  Specification of Letters Patent. Patented Jan. 2, 1912.

Application filed February 27, 1911. Serial No. 611,272.

*To all whom it may concern:*

Be it known that we, ELMER HICKS and CLARENCE E. HICKS, citizens of the United States of America, and residents of Montezuma, Poweshiek county, Iowa, have invented a new and useful Belt-Holder for Engines, of which the following is a specification.

The object of this invention is to provide an improved construction for belt-holders for engines.

A further object of this invention is to provide improved means to facilitate the application of belts to and retention of the same on drive pulleys of traction engines during the operation of alining and setting the engines relative to apparatus to be driven, such as separators, corn-shellers and the like.

Our invention consists in the construction, arrangement and combination of elements hereinafter set forth, pointed out in our claims and illustrated by the accompanying drawing, in which—

Figure 1 is a side elevation illustrating our improved device applied as required for practical use, dotted lines, in addition to showing a pulley in outline, illustrating open position of the parts. Fig. 2 is a rear elevation of the same.

In the construction and application of the device as shown the numeral 10 designates a supporting plate adapted to be bolted to and vertically adjustable on angle plates 11, 12, said angle plates in turn being bolted to and supported on a cap 13 of a bearing employed to carry the drive shaft 14 of an engine. In this instance the bearing is shown mounted on a boiler 15 and the shaft 14 is shown extending transversely of the boiler. A drive pulley 16 is shown by dotted lines concentric with the shaft 14 and broken away at one side to economize space on the drawing. An adjusting bar 17 is mounted vertically along one side of the supporting plate 10 and is secured thereto by bolts 18, 19, the bolt 19 extending through an arcuate slot 20 in the plate by means of which the adjusting bar may be moved through and set at any point in an arc at any desired angle to the shaft 14. A supporting rod 21 is clamped at its lower end to and rises from the adjusting bar 17. The supporting rod 21 is formed with an arm 22 extending laterally at its upper end, which arm crosses the drive pulley 16 parallel with and above the shaft 14. A frame bar 23, of arcuate form and having a radius preferably greater than that of the drive pulley, is formed with a bearing 24 on one end, which bearing receives and is adapted for lateral and circumferential adjustment on the arm 22. The bearing 24 engages a set collar 25 by means of which it may be set in any desired position longitudinally of the arm 22 to compensate for differences in the width of face of the drive pulleys or the spacing of such drive pulleys from the supporting means on different engines with which the device forming the subject matter of this invention may be used.

A bracket 26 is adjustably mounted on and near the upper end of the frame bar 23 and a bracket 27 is adjustably mounted on and near the lower end of said frame bar. The brackets 26, 27 are of right-angled form and one arm of each bracket extends across and is clamped to the frame bar while another arm of each bracket extends radially of the space within the arc of the frame bar. The inwardly extending arms of the brackets 26, 27 are formed with longitudinal slots and a tie rod 28 extends from one bracket to the other, as a chord of the arc of the frame bar 23, and is connected to said arms by bolts 29, 30 extending through said slots and through end portions of the tie rod. The tie rod may be formed with a plurality of bolt holes in one or both end portions so as to adjust the connection between said tie rod and the brackets 26, 27 supplemental to the adjustment provided by the slots in said brackets. The frame bar 23 is further strengthened at the point of application of the bracket 27 thereto by a strap 31 laid on and concentric with the inner surface of the frame bar, extending longitudinally thereof and clamped thereto at its ends by set collars 32, 33 embracing the frame bar. A notched detent or hook 34 is fixed to or formed on and extends outwardly from the base arm of the bracket 27 and is adapted to receive engagement of and hold a draft device or chain 35 hereinafter described. A plurality of arms 36, 37, 38, in this instance three in number, are secured to and extend laterally from the frame bar 23 toward the boiler 15. The arms 36, 37, 38 are alike in construction and are located near the upper end, center and lower end respectively of the frame bar and said arms are secured to said frame bar by bolts 39 and suitable sockets 40. It is the function of the sockets to embrace the frame bar at one side and an arm at the other side and prevent movement of rotation of the arms relative to said bar. Flanged friction wheels 41, 42, 43, in this instance three in number, are mounted on and extend inwardly on radial lines from the extremities of the arms 36, 37, 38 and are adapted to engage the inner margin of a drive belt (not shown) at times and prevent said belt from running off the pulley 16 toward the boiler 15. For such reason the friction wheels 41, 42, 43 extend across and at one side of the rim of the drive pulley 16. Bearings 44, 45, 46, in this instance three in number, are fixed to the frame bar near the upper end, center and lower end respectively thereof and preferably contiguous to the clamps 40, and rock shafts or crank arms 47, 48, 49 are mounted for oscillation in said bearings. The rock shafts or crank arms 47, 48, 49 also are adjustable laterally through the bearings 44, 45, 46 and are secured in such adjustment at one end each by a set collar 50. On the opposite side of the bearings 44, 45, 46 from the set collars 50, the rock shafts 47, 48, 49 are provided with slotted crank arms 51, 52, 53 and said crank arms are secured to the rock shafts by set screws and serve the additional function of set collars acting in opposition to the collars 50 to fix and determine the adjustment of said rock shafts. An arcuate connecting rod 54 is pivoted at one end to a bolt 55 mounted in the slot of the crank arm 51 and is pivoted at the opposite end to a bolt 56 mounted in the slot of the crank arm 52. An arcuate connecting rod 57 is pivoted at one end to a bolt 58 mounted in the slot of the crank arm 52 and is pivoted at the other end to a bolt 59 mounted in the slot of the crank arm 53. By means of the various bolts and slots in the crank arms end portions of the arcuate connecting rods 54, 57 are adjustably and pivotally connected to said crank arms, thus providing means for adjusting the throw or range of movement of the crank arms and connecting rods. The radius of the arcuate rods 54, 57 preferably is greater than that of the frame bar 23. A retractile coil spring 60 is fixed at one end to the crank arm 52 and at the other end to the frame bar 23 at a point above the rock shaft 45 and tends to pull said crank arm, and through the rods 54, 57 all the crank arms, in one direction. Friction wheels 61, 62, 63, in this instance three in number, are pivotally mounted on extremities of the rock shafts 47, 48, 49 and extend radially across the rim of the pulley 16 on the opposite side from the friction wheels 41, 42, 43. The chain 35 is connected at one end to the pivot of the friction wheel 63 and is adapted to tie said pivot to the hook or notched detent 34 and hold the rock shaft 49 and pulley 63 thereon (and through the crank arms and connecting rods hold all of the friction wheels on that side of the pulley 16) against the resilience of the spring 60 in position extended across the rim of the pulley at the outer margin of the belt.

During the operation of placing a belt on or removing the same from the pulley 16 the outer holding devices are in the positions shown by dotted lines in Fig. 1, being brought into such positions by contraction of the spring 60 when the chain 35 is released from the notched detent or hook 34. This arrangement provides access to the pulley from the outer side. After the belt is placed manually on the pulley 16 (irrespective of the alinement of the engine or slack condition of the belt) the holding devices are adjusted into closed positions, as shown by solid lines in the drawing, by manual draft on the chain 35 and are held in such positions by engagement of the chain with the notched detent or hook 34. Then the engine can be advanced, turned, backed and adjusted into alinement with the machine to be driven and into such position as to tighten the belt to the required degree and all of such operations can be performed without holding the belt manually on the pulley 16 and without risk of accidental removal of said belt from the pulley.

We claim as our invention—

1. A belt-holder for engines, comprising an adjustable support, an arcuate frame adjustably mounted on said support, inner guides fixed to said frame, outer guides hinged to said frame, and means for moving said outer guides through arcs relative to the arcuate frame.

2. A belt-holder for engines, comprising an adjustable support, an arcuate frame adjustably mounted on said support, inner guides fixed to said frame, outer guides hinged to said frame, rods connecting said outer guides, a spring acting on said outer guides in one direction, and manually operated devices acting on said outer guides in opposition to said spring.

3. A belt-holder for engines, comprising an adjustable support, an arcuate frame adjustably mounted on said support, inner guides fixed to said frame, outer guides hinged to said frame, arcuate rods connecting said outer guides, a spring acting on said outer guides in one direction, and manually operated devices acting on said outer guides in opposition to said spring.

4. In a belt-holder for engines, a support comprising base members of angular form, a base plate adjustably mounted thereon, an adjusting bar mounted on and adapted to be moved through an arc relative to said base plate, a supporting arm mounted on and adjustable longitudinally of said adjusting bar, an arcuate frame carried by said supporting arm, guides carried by said frame, and means for adjusting said guides relative to said frame.

5. A belt-holder for engines, comprising a suitable support, an arcuate frame adjustably mounted on said support, brackets on said frame, a rod adjustably secured to said brackets and extending across said frame, and holding devices mounted on said frame.

6. A belt-holder for engines, comprising a suitable support, an arcuate frame adjustably mounted on said support, a brace extending transversely of said frame, holding devices fixed to said frame, holding devices pivoted to said frame, a spring acting on the pivoted holding devices in one direction, and actuating means acting on said pivoted holding devices in opposition to the spring.

7. In a belt-holder for engines, an arcuate frame, an inner set of holding devices fixed to said frame, an outer set of holding devices pivoted to said frame, said holding devices being adjustable independently of each other relative to the frame on lines parallel with the axis of the frame, and means for moving said pivoted holding devices relative to the frame, said moving means adapted to be fixed at times relative to the frame.

8. In a belt-holder for engines, an arcuate frame, arms adjustably secured to and extending laterally from said frame, friction wheels on the extremities of said arms, rock shafts adjustably secured to and extending laterally from said frame opposite to the arms, friction wheels on said rock shafts opposite to the first friction wheels, rods connecting said rock shafts, a spring acting on said rock shafts in one direction, and a draft device acting on said rock shafts in opposition to the spring.

9. In a belt-holder for engines, an arcuate frame, arms adjustably secured to and extending laterally from said frame, friction wheels on the extremities of said arms, rock shafts adjustably secured to and extending laterally from said frame opposite to the arms, friction wheels on said rock shafts opposite to the first friction wheels, crank arms fixed to said rock shafts, rods connecting the crank arms, a spring acting on one of said crank arms in one direction, and a draft device acting on one of said crank arms in opposition to the spring.

10. In a belt-holder for engines, an arcuate frame, arms fixed to and extending laterally of said frame, friction wheels on extremities of said arms, rock shafts journaled on and extending laterally of said frame in opposition to the arms, friction wheels on the extremities of said rock shafts in opposition to the first friction wheels, crank arms on said rock shafts, arcuate rods adjustably connecting said crank arms, a spring acting on said crank arms in one direction, a chain acting on said crank arms in opposition to the spring, and engaging means carried by said frame and adapted to hold said chain at times.

11. In a belt-holder for engines, an arcuate frame, arms fixed to and extending laterally of said frame, friction wheels on extremities of said arms, rock shafts journaled on and extending laterally of said frame in opposition to the arms, friction wheels on the extremities of said rock shafts in opposition to the first friction wheels, crank arms on said rock shafts, a spring acting on said crank arms in one direction, a chain acting on said crank arms in opposition to the spring, engaging means carried by said frame and adapted to hold said chain at times, and a brace adjustably secured to and extending across said arcuate frame.

12. In a belt-holder for engines, an arcuate frame, arms fixed to and extending laterally of said frame, friction wheels on extremities of said arms, rock shafts adjustably journaled on said frame and extending laterally in opposition to said arms, friction wheels on the extremities of said rock shafts in opposition to the first friction wheels, crank arms on said rock shafts, a spring acting on said crank arms in one direction, a chain acting on said crank arms in opposition to the spring, and engaging means carried by said frame and adapted to hold said chain at times.

Signed by ELMER HICKS at Des Moines, Iowa, this fourth day of January, 1911. Signed by CLARENCE E. HICKS at Montezuma, Iowa, this 4" day of February, 1911.

ELMER HICKS,
CLARENCE E. HICKS.

Witnesses to signature of Elmer Hicks:
S. C. SWEET,
EARL M. SINCLAIR.

Witnesses to signature of Clarence E. Hicks:
A. C. McGILL,
HALA MORTLAND.

---

Copies of this patent may be obtained for five cents each, by addressing the "Commissioner of Patents, Washington, D. C."